(12) United States Patent
Atarius et al.

(10) Patent No.: US 12,126,662 B2
(45) Date of Patent: Oct. 22, 2024

(54) CONFIGURING A SIP REGISTER MESSAGE

(71) Applicant: Lenovo (Singapore) Pte. Ltd., New Tech Park (SG)

(72) Inventors: Roozbeh Atarius, La Jolla, CA (US); Dimitrios Karampatsis, Ruislip (GB)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 0 days.

(21) Appl. No.: 18/261,773

(22) PCT Filed: Jan. 14, 2022

(86) PCT No.: PCT/IB2022/050280
§ 371 (c)(1),
(2) Date: Jul. 17, 2023

(87) PCT Pub. No.: WO2022/153224
PCT Pub. Date: Jul. 21, 2022

(65) Prior Publication Data
US 2024/0080348 A1     Mar. 7, 2024

Related U.S. Application Data

(60) Provisional application No. 63/140,148, filed on Jan. 21, 2021, provisional application No. 63/138,342, filed on Jan. 15, 2021.

(51) Int. Cl.
*G06F 15/173*      (2006.01)
*H04L 65/1016*     (2022.01)
(Continued)

(52) U.S. Cl.
CPC ...... *H04L 65/1104* (2022.05); *H04L 65/1016* (2013.01); *H04L 65/1073* (2013.01)

(58) Field of Classification Search
CPC ............. H04L 65/1104; H04L 65/1016; H04L 65/1073
See application file for complete search history.

(56) References Cited

U.S. PATENT DOCUMENTS

2007/0259651 A1* 11/2007 Bae .......... H04L 69/24
455/412.1
2010/0223339 A1* 9/2010 Cheng ...... H04L 61/25
709/206
(Continued)

OTHER PUBLICATIONS

PCT/IB2022/050280, "Notification of Transmittal of the International Search Report and the Written Opinion of the International Searching Authority, or the Declaration", International Searching Authority, Mar. 17, 2022, pp. 1-12.
(Continued)

*Primary Examiner* — Padma Mundur
(74) *Attorney, Agent, or Firm* — Kunzler Bean & Adamson

(57) ABSTRACT

Apparatuses, methods, and systems are disclosed for configuring a SIP register message. One method includes transmitting, by a device to a network entity, a session initiation protocol (SIP) register message. The SIP register message includes: a first field of the SIP register message, wherein the first field of the SIP register message includes an identifier indicating a status for an identity; and a second field of the SIP register message. The second field of the SIP register message includes the identity. The method includes receiving an acknowledgement indicating that the device is registered.

18 Claims, 8 Drawing Sheets

(51) Int. Cl.
  *H04L 65/1073* (2022.01)
  *H04L 65/1104* (2022.01)

(56) References Cited

U.S. PATENT DOCUMENTS

2017/0251029 A1* 8/2017 Atarius .................. H04W 8/18
2017/0279858 A1 9/2017 Atarius et al.

OTHER PUBLICATIONS

Lenovo et al., "Discussion on how to route an incoming call or message", 3GPP TSG CT WG1 Meeting #127bis-e C1-210159, Jan. 25-29, 2021, pp. 1-5.

Lenovo et al., "Temporary activation and deactivation of identities", 3GPP TSG-CT WG1 Meeting #127bis-e C1-21160, Jan. 25-29, 2021, pp. 1-3.

Rosenberg et al., "SIP: Session Initiation Protocol", Standards Track, Network Working Group RFC 3261, Jun. 2002, pp. 1-269.

Rosenberg, "A Session Initiation Protocol (SIP) Event Package for Registrations", Standards Track, Network Working Group RFC 3680, Mar. 2004, pp. 1-26.

Rosenberg et al., "Caller Preferences for the Session Initiation Protocol (SIP)", Standards Track, Network Working Group RFC 3841, Aug. 2004, pp. 1-26.

Schulzrinne, "The tel URI for Telephone Numbers", Standards Track, Network Working Group RFC 3966, Dec. 2004, pp. 1-17.

Camarillo, "Message Body Handling in the Session Initiation Protocol (SIP)", Standards Track, Network Working Group RFC 5621, Sep. 2009, pp. 1-19.

Levy et al., "Diversion Indication in SIP", Historic, Independent Submission RFC 5806, Mar. 2010, pp. 1-53.

Roach, "SIP-Specific Event Notification", Standards Track, IETF RFC 6665, Jul. 2012, pp. 1-53.

Jesske et al., "Private Header (P-Header) Extensions to the Session Initiation Protocol (SIP) for the 3GPP", Informational, IETF RFC 7315, Jul. 2014, pp. 1-43.

SA WG1, "New WID on multi-device and multi-identity (MuD) (from S1-181699)", 3GPP TSG-SA Meeting #80 SP-180315, Jun. 13-15, 2018, pp. 1-2.

3GPP, "3rd Generation Partnership Project; Technical Specification Group Services and System Aspects; IP Multimedia Core Network Subsystem (IMS) Multimedia Telephony Service and supplementary services; Stage 1 (Release 17)", 3GPP TS 22.173 V17.2.0, Dec. 2020, pp. 1-77.

3GPP, "3rd Generation Partnership Project; Technical Specification Group Services and System Aspects; IP Multimedia Subsystem (IMS); Stage 2 (Release 16)", 3GPP TS 23.228 V16.6.0, Dec. 2020, pp. 1-349.

3GPP, "3rd Generation Partnership Project; Technical Specification Group Core Network and Terminals; Support of multi-device and multi-identity in the IP Multimedia Subsystem (IMS); Stage 3 (Release 17)", 3GPP TS 24.174 V17.1.0, Dec. 2020, pp. 1-32.

3GPP, "3rd Generation Partnership Project; Technical Specification Group Core Network and Terminals; IP multimedia call control protocol based on Session Initiation Protocol (SIP) and Session Description Protocol (SDP); Stage 3 (Release 17)", 3GPP TS 24.229 V17.1.0, Dec. 2020, pp. 1-1070.

* cited by examiner

CONFIGURING A SIP REGISTER MESSAGE

CROSS-REFERENCE TO RELATED APPLICATIONS

This application claims priority to U.S. patent application Ser. No. 63/138,342 entitled "METHOD AND APPARATUS FOR ACTIVATION AND DEACTIVATION OF MULTIPLE IMS IDENTITIES" and filed on Jan. 15, 2021 for Roozbeh Atarius and U.S. patent application Ser. No. 63/140,148 entitled "APPARATUSES, METHODS, AND SYSTEMS FOR ACTIVATION AND DEACTIVATION OF MULTIPLE IMS IDENTITIES" and filed on Jan. 21, 2021 for Roozbeh Atarius, all of which are incorporated herein by reference in their entirety.

FIELD

The subject matter disclosed herein relates generally to wireless communications and more particularly relates to configuring a SIP register message.

BACKGROUND

In certain wireless communications networks, identities for a contact may be activated and/or deactivated. A UE may need to know which contacts to activate and/or deactivate.

BRIEF SUMMARY

Methods for configuring a SIP register message are disclosed. Apparatuses and systems also perform the functions of the methods. One embodiment of a method includes transmitting, by a device to a network entity, a session initiation protocol (SIP) register message. The SIP register message includes: a first field of the SIP register message, wherein the first field of the SIP register message includes an identifier indicating a status for an identity; and a second field of the SIP register message. The second field of the SIP register message includes the identity. In some embodiments, the method includes receiving an acknowledgement indicating that the device is registered.

One apparatus for configuring a SIP register message includes a device. In some embodiments, the apparatus includes a transmitter that transmits, by the device to a network entity, a session initiation protocol (SIP) register message. The SIP register message includes: a first field of the SIP register message, wherein the first field of the SIP register message includes an identifier indicating a status for an identity; and a second field of the SIP register message. The second field of the SIP register message includes the identity. In various embodiments, the apparatus includes a receiver that receives an acknowledgement indicating that the device is registered.

Another embodiment of a method for configuring a SIP register message includes receiving, at a network entity from a device, a session initiation protocol (SIP) register message. The SIP register message includes: a first field of the SIP register message, wherein the first field of the SIP register message includes an identifier indicating a status for an identity; and a second field of the SIP register message. The second field of the SIP register message includes the identity. In some embodiments, the method includes transmitting an acknowledgement indicating that the device is registered.

Another apparatus for configuring a SIP register message includes a network entity. In some embodiments, the apparatus includes a receiver that receives, from a device, a session initiation protocol (SIP) register message. The SIP register message includes: a first field of the SIP register message, wherein the first field of the SIP register message includes an identifier indicating a status for an identity; and a second field of the SIP register message. The second field of the SIP register message includes the identity. In various embodiments, the apparatus includes a transmitter that transmits an acknowledgement indicating that the device is registered.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
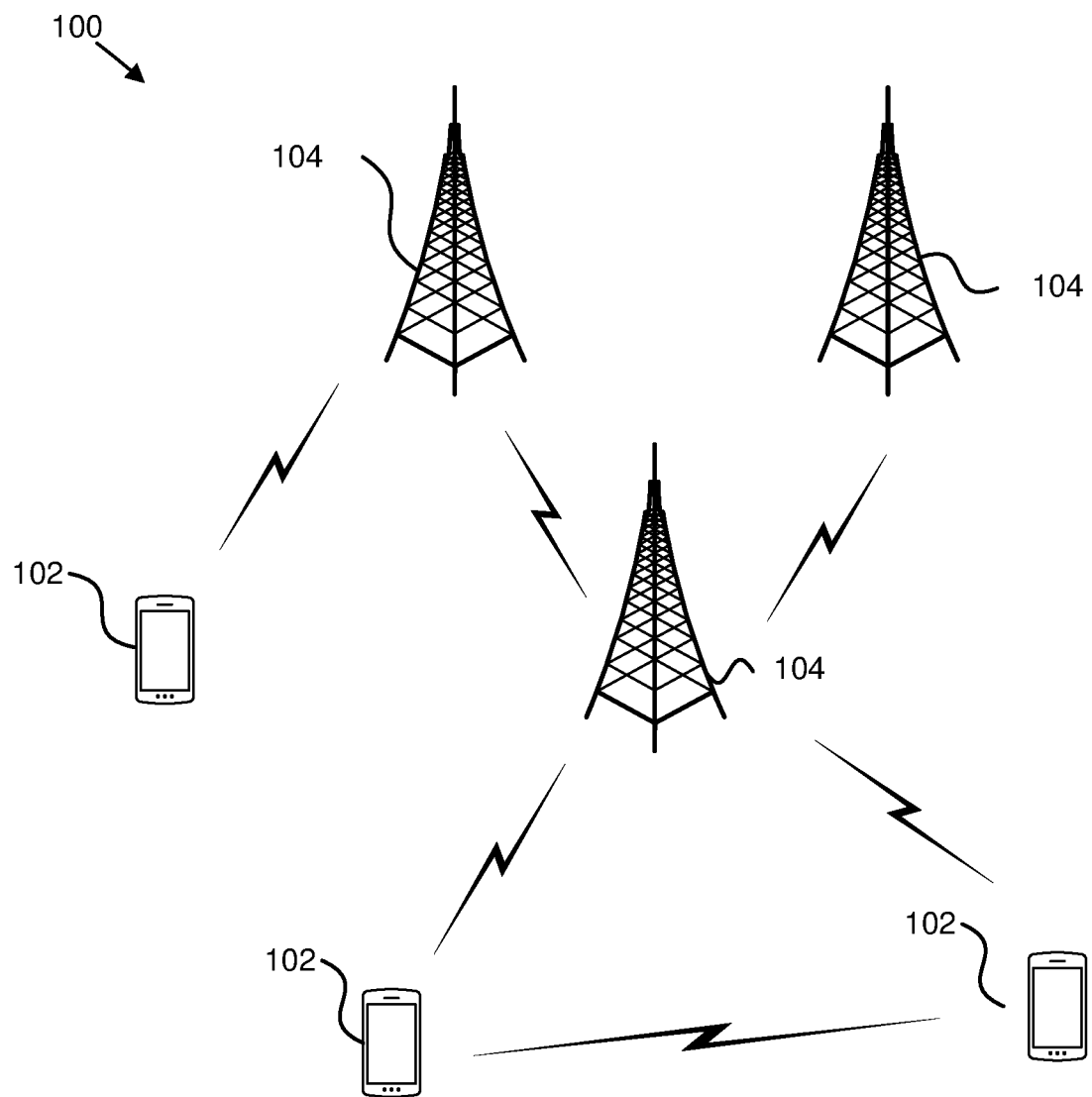
FIG. 1 is a schematic block diagram illustrating one embodiment of a wireless communication system for configuring a SIP register message.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each FIGURE may refer to elements of proceeding FIGURES Like numbers refer to like elements in all FIGURES, including alternate embodiments of like elements.

FIG. 1 depicts an embodiment of a wireless communication system 100 for configuring a SIP register message. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals. In certain embodiments, the remote units 102 may communicate directly with other remote units 102 via sidelink communication.

The network units 104 may be distributed over a geographic region. In certain embodiments, a network unit 104 may also be referred to and/or may include one or more of an access point, an access terminal, a base, a base station, a location server, a core network ("CN"), a radio network entity, a Node-B, an evolved node-B ("eNB"), a 5G node-B ("gNB"), a Home Node-B, a relay node, a device, a core network, an aerial server, a radio access node, an access point ("AP"), new radio ("NR"), a network entity, an access and mobility management function ("AMF"), a unified data management ("UDM"), a unified data repository ("UDR"), a UDM/UDR, a policy control function ("PCF"), a radio access network ("RAN"), a network slice selection function ("NSSF"), an operations, administration, and management ("OAM"), a session management function ("SMF"), a user plane function ("UPF"), an application function, an authentication server function ("AUSF"), security anchor functionality ("SEAF"), trusted non-3GPP gateway function ("TNGF"), or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR protocols standardized in third generation partnership project ("3GPP"), wherein the network unit 104 transmits using an OFDM modulation scheme on the downlink ("DL") and the remote units 102 transmit on the uplink ("UL") using a single-carrier frequency division multiple access ("SC-FDMA") scheme or an orthogonal frequency division multiplexing ("OFDM") scheme. More generally, however, the wireless communication system 100 may implement some other open or proprietary communication protocol, for example, WiMAX, institute of electrical and electronics engineers ("IEEE") 802.11 variants, global system for mobile communications ("GSM"), general packet radio service ("GPRS"), universal mobile telecommunications system ("UMTS"), long term evolution ("LTE") variants, code division multiple access 2000 ("CDMA2000"), Bluetooth®, ZigBee, Sigfoxx, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In various embodiments, a remote unit 102 may transmit, by a device to a network entity, a session initiation protocol (SIP) register message. The SIP register message includes: a first field of the SIP register message, wherein the first field of the SIP register message includes an identifier indicating a status for an identity; and a second field of the SIP register message. The second field of the SIP register message includes the identity. In some embodiments, the remote unit 102 may receive an acknowledgement indicating that the device is registered. Accordingly, the remote unit 102 may be used for configuring a SIP register message.

In certain embodiments, a network unit 104 may receive, from a device, a session initiation protocol (SIP) register message. The SIP register message includes: a first field of the SIP register message, wherein the first field of the SIP register message includes an identifier indicating a status for an identity; and a second field of the SIP register message. The second field of the SIP register message includes the identity. In some embodiments, the network unit 104 may transmit an acknowledgement indicating that the device is registered. Accordingly, the network unit 104 may be used for configuring a SIP register message.

Figure 2:
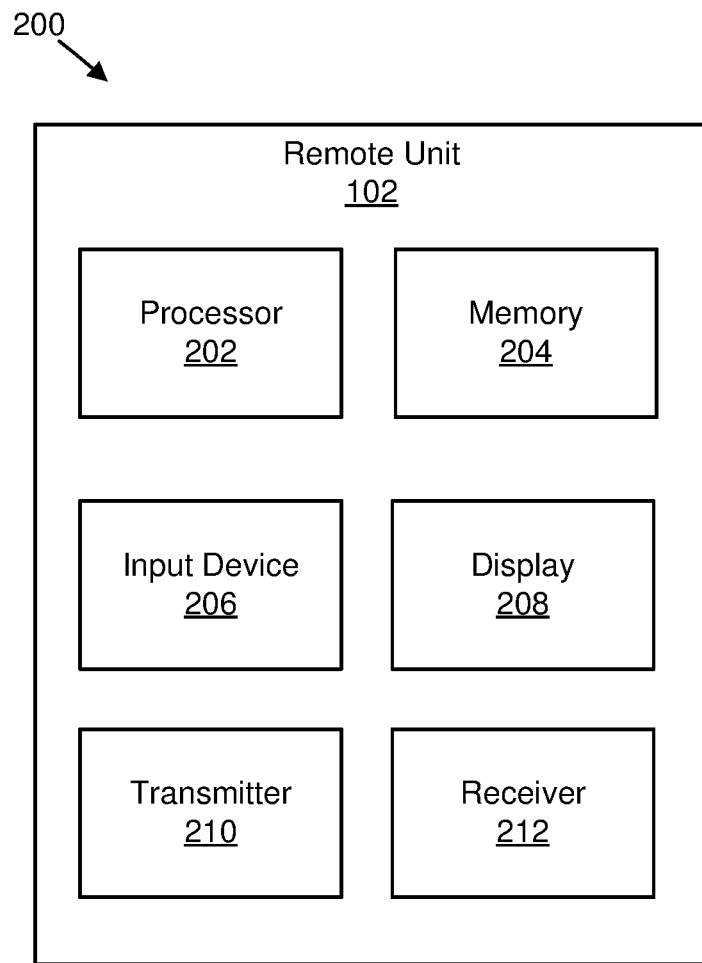
FIG. 2 is a schematic block diagram illustrating one embodiment of an apparatus that may be used for configuring a SIP register message.

FIG. 2 depicts one embodiment of an apparatus 200 that may be used for configuring a SIP register message. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, a liquid crystal display ("LCD"), a light emitting diode ("LED") display, an organic light emitting diode ("OLED") display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

In certain embodiments, the transmitter 210 transmits, by the device to a network entity, a session initiation protocol (SIP) register message. The SIP register message includes: a first field of the SIP register message, wherein the first field of the SIP register message includes an identifier indicating a status for an identity; and a second field of the SIP register message. The second field of the SIP register message includes the identity. In various embodiments, the receiver 212 receives an acknowledgement indicating that the device is registered.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
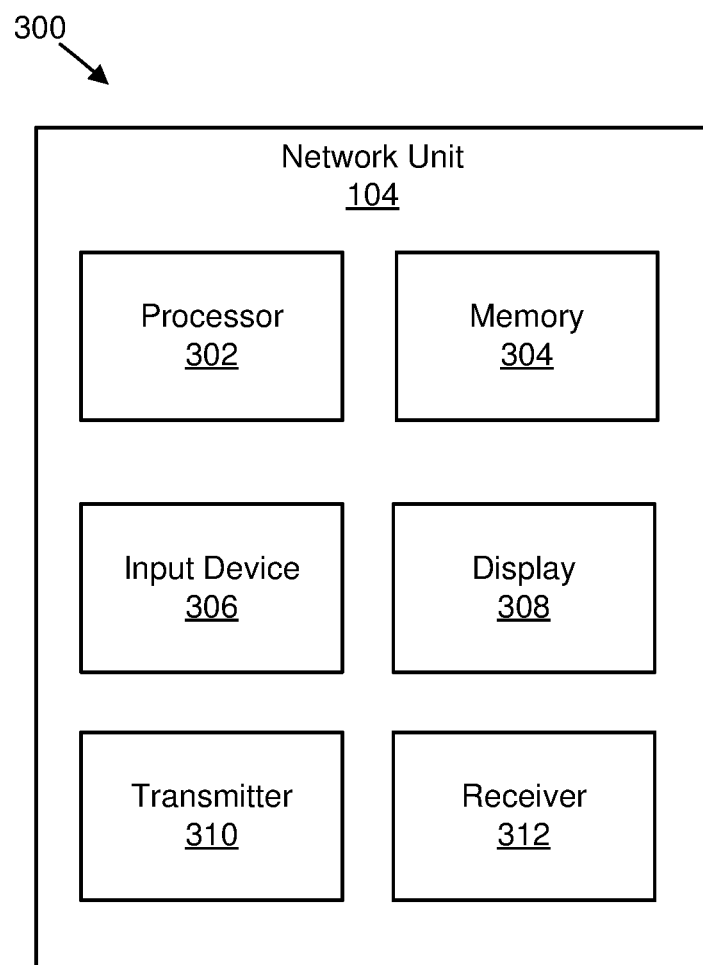
FIG. 3 is a schematic block diagram illustrating one embodiment of an apparatus that may be used for configuring a SIP register message.

FIG. 3 depicts one embodiment of an apparatus 300 that may be used for configuring a SIP register message. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In certain embodiments, the receiver 312 receives, from a device, a session initiation protocol (SIP) register message. The SIP register message includes: a first field of the SIP register message, wherein the first field of the SIP register message includes an identifier indicating a status for an identity; and a second field of the SIP register message. The second field of the SIP register message includes the identity. In various embodiments, the transmitter 310 transmits an acknowledgement indicating that the device is registered.

In certain embodiments, it may not be clear how to activate or deactivate selected identities for a contact. The activation and deactivation may be required for the user to allow or deny any incoming call or message. In such embodiments, a user may be allowed to identify which identity should be active and which identity should not, without the removal or the reinstallment of boundings between the identities and the contact.

In some embodiments, there may be four different identities: 1) native identity: identity used by a user equipment ("UE") (e.g., mobile station integrated services digital network ("MSISDN"), tel uniform resource identifier ("URI"), or session initiation protocol ("SIP") URI) that is associated with an international mobile subscriber identity ("IMSI") that is used by a device for internet protocol ("IP") multimedia subsystem ("IMS") registration; 2) alternative identity: identity used by the UE (e.g., MSISDN, tel URI, or SIP URI) that is not associated to the IMSI that is currently used by the device for IMS registration and which is associated with a different IMSI for the same IMS subscription owned by the same IMS network; 3) external alternative identity: identity used by the UE (e.g., MSISDN, tel URI or SIP URI) that is not associated with the IMSI which is currently used by the device for IMS registration and which is associated with a different IMSI for another IMS subscription owned by the same or a different IMS network; and/or 4) virtual identity: identity used by the UE (e.g., MSISDN, tel URI, or SIP URI) that is not associated as a native identity with any IMSI that is associated with an IMS identity module ("ISIM") or universal subscriber identity module ("USIM") in a device. The virtual identity may be used by a single user only or by several users having IMS subscriptions in the same or different IMS networks.

In various embodiments, a non-native identity is the same as alternative identity, external alternative identity, and virtual identity. In such embodiments, the native identity, the alternative identity, and the external alternative identity are all dependent on an IMS registration although the external alternative identity has been registered by one IMS registration while it is used by other users vs. a virtual identity not being dependent on any IMS registration.

In certain embodiments, a native identity and alternative identity are IMS registered by all users. An external alternative identity is IMS registered by one user and may be used by more users. A virtual identity is not IMS registered.

In some embodiments, if an identity is considered to be an IP multimedia public identity ("IMPU"), then the identities may only be shared if the IMS subscription is the same. This may be independent if the identities belong to the same IP multimedia private identity ("IMPI") (e.g., contact) or different IMPIs (e.g., contacts).

In various embodiments, there may be two cases: 1) the same IMPI: in this case one IMPI or contact has several IMPUs or identities—the IMPU may be considered as a native identity; and 2) different IMPIs: in this case two IMPIs or contacts share the same identity—the IMPIs has the same IMS subscription and may have an alternative identity.

In some embodiments, a shared identity may belong to different IMS subscriptions. In various embodiments, added identities may but do not have to belong to a served user. Moreover, identities may be part of different subscriptions and different operators.

In certain embodiments, public user identities may be shared across multiple private user identities within the same IMS subscription.

In some embodiments: multi-device ("MuD") and multi-identity ("MiD") may be specified. MuD may enable a user to have multiple devices (e.g., a user can have a smartphone, smartwatch, virtual reality ("VR") glasses, etc.) that may share multiple identities. These identities may belong to a user or may have been donated from another user. When a terminated session arrives for a shared identity, all of these UE's could be alerted for the incoming session. However, requirements may not have provisions for a user being able to configure which UEs should receive a mobile terminated session (e.g., a user has a smart watch (wearable) and a smart phone. During the day the user goes for a jog, they leave the smartphone in the office but keep the smartwatch on to track their progress. They wish not to be disturbed while jogging).

In various embodiments, identities that are shared are activated and deactivated at the time of provision and withdrawal. In certain embodiments, MuD and MiD services are activated at provisioning and deactivated at withdrawal. Temporary activation and deactivation of identities may not be achieved by having the service provision or withdrawn. In some embodiments, it may be impractical for a user to contact their operator to ask to have the service withdrawn if an identity should be shared or activated for sharing during a set period of time during the day. It may be beneficial to provide a user with an ability to set user preferences in the network as to what identities should be activated or deactivated.

In certain embodiments, any UE having the exact same ISIM or different ISIM and/or USIM may receive a call simultaneously as long as they share the same identity. Such UEs may share multiple identities such as alternative identities and external alternative identities.

In some embodiments, since a session initiation protocol ("SIP") INVITE is populated by using an identity (e.g., IMPU), for two different devices to get alerted for an incoming call: 1) devices do not share any identities and they each have one contact registered to their own identity (e.g., native identity)—there is no issue how to route the incoming INVITE in this case; 2) devices share the same identity between two IMPIs with the same IMS subscription and/or the identity is an alternative identity—there is no issue how to route the incoming INVITE in this case since the contact can be registered to the identity with different priorities or caller preferences; 3) devices share the same identity which is originally registered by another IMPI to a different IMS subscription (e.g., an extended alternative identity)—this may be complicated because the devices have not registered their contacts to the identity, SIP procedure for caller preferences cannot be used to route the incoming INVITE—the user may use a configuration access protocol ("XCAP") to deactivate and/or activate the identity for its contact—however, the deactivation and activation may require approval procedures from an owner of the identity; and/or 4) devices share the same identity which is not IMS registered (e.g., virtual identity).

In various embodiments: 1) a 3GPP system may support a mechanism for an authorized user to set user preferences to indicate which identities are active or inactive on a specific UE; and/or 2) if an identity is activated or deactivated, all UEs that can use that identity to either originate or terminate a session may receive a notification of the change of status.

In a first embodiment, since routing an incoming INVITE may be an issue due to a contact not being registered to the identity, a method may be based on a UE activating or deactivating identities which the contact of the device is registered to and with their associated identities by populating a SIP REGISTER and adding an IMS communication identifier ("ICSI") or an IMS application reference identifier ("IARI") to the contact header together with the UE's contact and to indicate the activation and deactivation of the identities associated with the contact for incoming INVITE. The associated identities are identified by populating a P-Associated-URI header field and transmitting the SIP REGISTER to the IMS network.

In certain embodiments, an example for g.3gpp.icsi-ref activation and deactivation capabilities may be: g.3gpp.icsi-ref="urn %3Aurn-7%3A3gpp-service.ims.icsi.active" and g.3gpp.icsi-ref="urn %3Aurn-7%3A3gpp-service.ims.icsi.inactive". In some embodiments, an example for g.3gpp.iari-ref activation and deactivation capabilities may be: g.3gpp.iari-ref="urn %3Aurn-7%3A3gpp-service.ims.iari.active" and g.3gpp.iari-ref="urn %3Aurn-7%3A3gpp-service.ims.iari.inactive".

In various embodiments, upon receipt of ICSI or IARI in a contact header field and identities in a P-Associated-URI header field, an application server ("AS") may act upon a request for the activation or deactivation of identities upon receiving any incoming INVITE. Therefore, if an identity is requested to be activated, the AS may forward the incoming INVITE towards the UE via a serving ("5") call session control function ("CSCF") ("S-CSCF") and proxy ("P") CSCF ("P-CSCF") ("P/S-CSCF")) and, if an identity is requested to be deactivated, the AS may deny the incoming INVITE and transmit an appropriate response towards the originator of the INVITE request as illustrated in FIG. 4.

Figure 4:
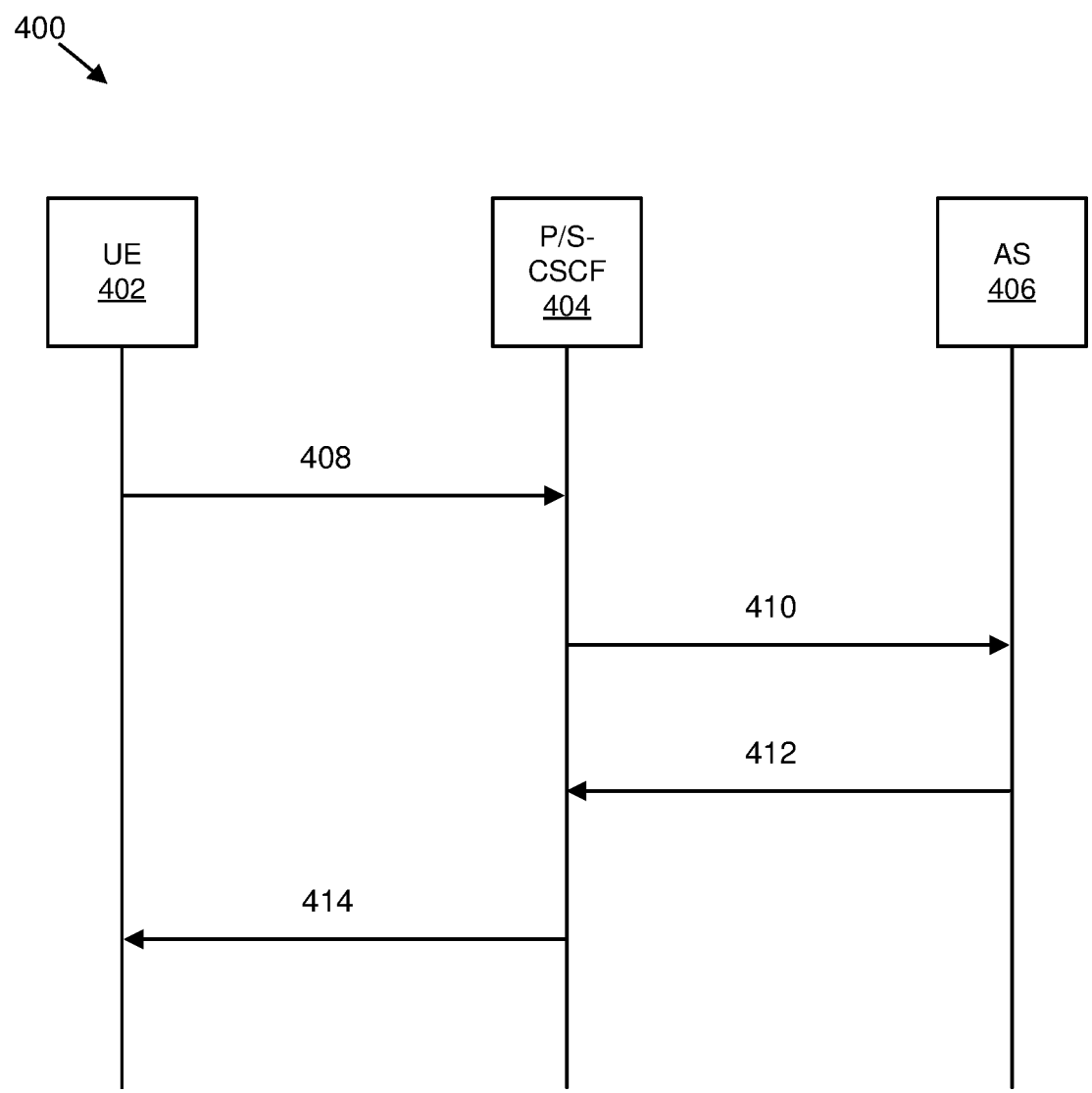
FIG. 4 is a schematic block diagram illustrating one embodiment of a system for temporary activation and deactivation of a contact.

FIG. 4 is a schematic block diagram illustrating one embodiment of a system 400 for temporary activation and deactivation of a contact. The system 400 includes a UE 402, a P/S-CSCF 404, and an AS 406. Each of the communications in the system 400 may include one or more messages.

In a first communication 408, the UE 402 may transmit a REGISTER request message (e.g., contact: ICSI, P-Associated-URI: Identities). For the UE 402 to deactivate or activate the UE 402 temporarily, the UE 402 may populate the REGISTER request message with a contact header including an ICSI and/or IARI which may indicate that the contact is temporarily deactivated or activated. The REGISTER request may include the P-Associated-URI header field showing the associated URIs or associated identities with the identity that the contact has registered to. The associated URIs or identities may be the identities that are to be activated or deactivated due to the REGISTER request or the contact header may include an expire time to indicate that a re-registration may be needed to change the status of the contact from inactive to active or vice versa. If the contact is to be deactivated and activated with all the associated identities, the REGISTER request message may not include the P-Associated-URI header field with the associated URIs or identities and only include the contact header field with the ICSI and/or IARI indicating the deactivation or activation of the contact.

In a second communication 410, the P/S-CSCF 404 may transmit the REGISTER request message (e.g., contact: ICSI, P-Associated-URI: Identities). The P/S-CSCF 404 may receive the REGISTER request message and may populate a new REGISTER message by adding the S-CSCF IP address and/or contact to the contact header field and may insert the original contact header with the UE's contact and the ICSI and/or IARI in the body of the new REGISTER message. The S-CSCF may send the newly generated REGISTER message request towards the AS 406.

In a third communication 412, the AS 406 may transmit a 200 OK message. Upon receipt the REGISTER request, due to the value of the ICSI and/or IARI indicating activation and the identities in the P-Associated-URI header field, the AS 406 may forward the INVITE messages towards the UE 402 if the indication of ICSI and/or IARI is to activate the contact and the request URI of the INVITE is identical to one or more identities in the P-Associated-URI header field. The AS 406 may decline any INVITE message targeted to one or more identities that are identical to those in the P-Associated-URI header field that can be used by the contact due to the value of the ICSI and/or IARI indicating deactivation of those identities. The AS 406 may send an appropriate message to the originator of the INVITE what the reason is. The AS 406 acknowledge the reception of the REGISTER message by sending 200 OK towards the P/S-CSCF 404.

The AS 406 may decline any INVITE message targeted to any associated identity of a contact due to the value of ICSI and/or IARI indicating deactivation and if there is not any P-Associated-URI header field to specify the associated identities to be deactivated. Moreover, the AS 406 may accept any INVITE message targeted to all associated identities of a contact due to the value of ICSI and/or IARI indicating activation and if there is not any P-Associated-URI header field to specify the associated identities to be activated.

In a fourth communication 414, the P/S-CSCF 404 may transmit the 200 OK message. The P/S-CSCF 404 may send an acknowledge by sending 200 OK towards the UE 402. The acknowledgement includes the ICSI and/or IARI indicating activation or deactivation and the P-Associated-URI header field includes the identities that are activated or deactivated based on the indication by the ICSI and/or IARI.

Certain embodiments may be based on call forwarding, where a UE or a network sends a SIP 302 with a reason header field containing a reason code such as "not available". The SIP 302 moved temporarily may contain a contact to forward the incoming INVITE to another UE with a different contact.

Figure 5:
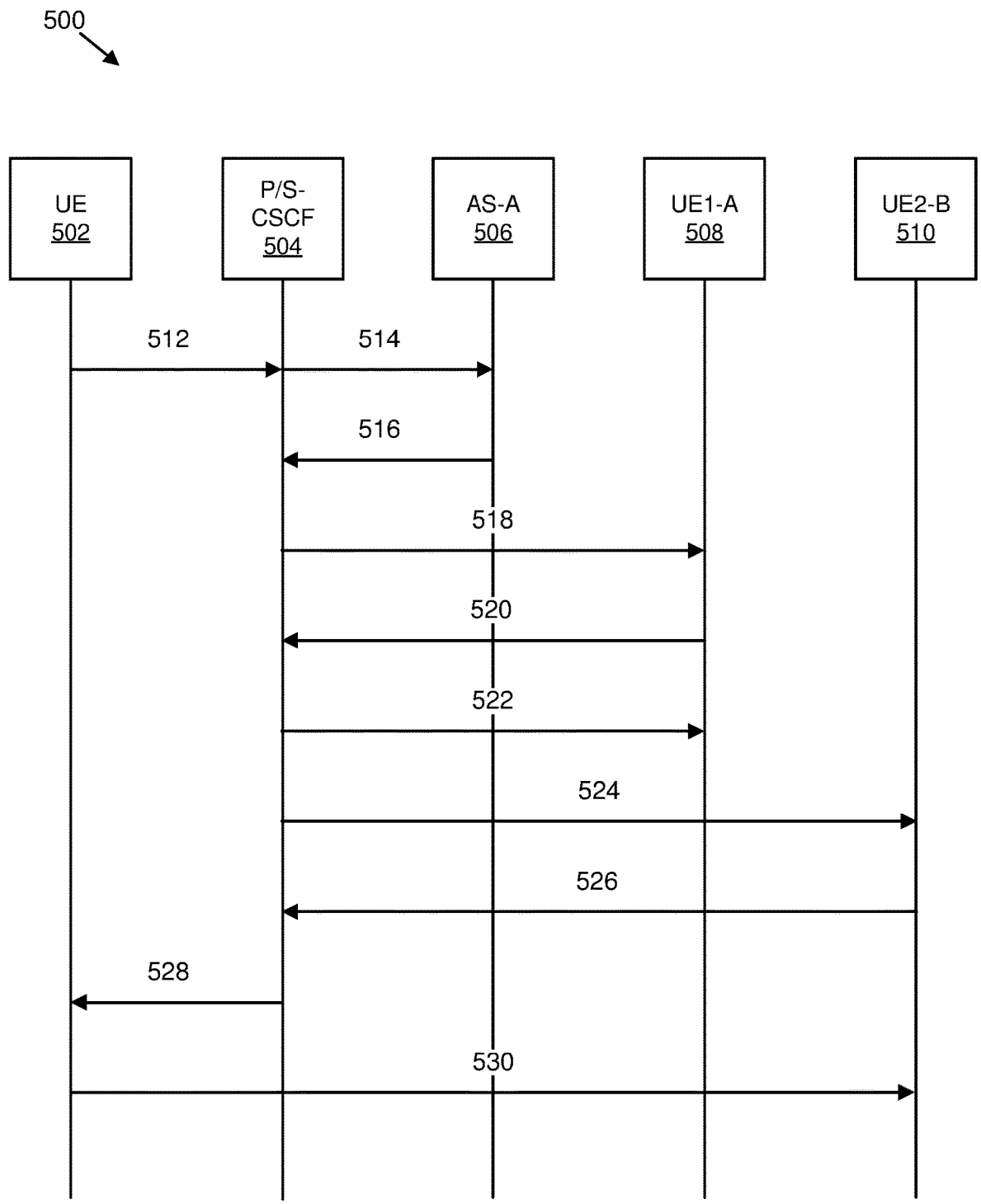
FIG. 5 is a schematic block diagram illustrating one embodiment of a system for diversion of a call to another UE using the same or different identity.

FIG. 5 is a schematic block diagram illustrating one embodiment of a system 500 for diversion of a call to another UE using the same or different identity. The system 500 includes a UE 502, a P/S-CSCF 504, an AS-A 506, a UE1-A 508, and a UE2-B 510. Each of the communications in the system 500 may include one or more messages. Moreover, FIG. 5 shows an implementation for the call diversion where UE1-A 508 divert the incoming call to different UE with another identity or same identity. The reason header field may have other values than unconditional.

In a first communication 512 and a second communication 514, an INVITE A may be sent to the AS-A 506. Moreover, in a third communication 516, a response to the INVITE A may be sent to the P/S-CSCF 504. Further, in a fourth communication 518, an INVITE UE1-A is transmitted to the UE1-A 508. In a fifth communication 520, a 302 message (e.g., contact: UE2-B, Diversion: UE1-A, Reason: Unconditional) is transmitted to the P/S-CSCF 504. In a sixth communication 522, an acknowledgement is transmitted. In a seventh communication 524, an INVITE UE2-B (Diversion: UE1-A, Reason: Unconditional) is transmitted to the UE2-B 510. In an eighth communication 526, a 200 OK message is transmitted to the P/S-CSCF 504. In a ninth communication 528, a 200 OK message is transmitted to the UE 502. In a tenth communication 530, an acknowledgement is sent to the UE2-B 510.

In various embodiments, a method may be based on a UE activating or deactivating identities that the contact of the device is registered to and with their associated identities by populating a SIP REGISTER and adding an ICSI or an IARI to the contact header together with the UE's contact and to indicate the activation and deactivation of the identities associated to the contact for incoming INVITE or incoming message, wherein the associated identities are identified in the body of the SIP REGISTER message and transmitting the SIP REGISTER to the IMS network.

In certain embodiments, an example for g.3gpp.icsi-ref activation and deactivation capabilities may be: g.3gpp.icsi-ref="urn %3Aurn-7%3A3gpp-service.ims.icsi.active" and g.3gpp.icsi-ref="urn %3Aurn-7%3A3gpp-service.ims.icsi.inactive". In some embodiments, an example for g.3gpp.iari-ref activation and deactivation capabilities may be: g.3gpp.iari-ref="urn %3Aurn-7%3A3gpp-service.ims.iari.active" and g.3gpp.iari-ref="urn %3Aurn-7%3A3gpp-service.ims.iari.inactive".

In various embodiments, a body of a SIP REGISTER message may have a content type with a multipurpose internet mail extensions ("MIME") type specifying the type of the media to be added in the body of the message. The MIME type may be newly defined and submitted for registration at internet assigned numbers authority ("IANA"). The MIME type may be reused from one which is available today. Since the identities may be of uniform resource identifier ("URI") an existing MIME type such as "text/xml", where "text" refers to the MIME media type name and "xml" refers to MIME subtype name, may be employed to describe the body of the SIP REGISTER message. In certain embodiments, a message may include: Content-Type: text/xml; <?xml version="1.0" encoding="UTF-8"?>; <list>; <entry.id="identity1"/>; <entry.id="identity2"/>; <entry.id="identity3"/>; and </list>.

In certain embodiments, a UE may send a REGISTER message towards the P/S-CSCF. The P/S-CSCF may receive the REGISTER request message and may populate a new REGISTER message by adding the S-CSCF IP address and/or contact to the contact header field and may insert the original contact header with the UE's contact and the ICSI and/or IARI in the body of the new REGISTER message. The S-CSCF may send the newly generated REGISTER message request towards the AS. Upon receipt the REGISTER request, due to the value of the ICSI and/or IARI indicating activation and the identities in the body of the REGISTER request, the AS may forward the INVITE messages towards the UE if the indication of ICSI and/or IARI is to activate the contact and the request URI of the INVITE is identical to one or more identities in the body.

In some embodiments, the AS may decline any INVITE message targeted to one or more identities that are identical to those in the body of the REGISTER message that may be used by the contact due to the value of the ICSI and/or IARI indicating deactivation of those identities. The AS may send an appropriate message to the originator of the INVITE what the reason is. The AS acknowledge the reception of the REGISTER message by sending 200 OK towards S-CSCF. The 200 OK message may include the same ICSI and/or IARI in the contact as the one in the original SIP REGISTER message and the same identities in the body of 200 OK as the ones in the body of the SIP REGISTER message. This may be interpreted by the UE as a confirmation about activation and deactivation of the selected identities.

In various embodiments, if the body of the SIP REGISTER message does not include any identity, the AS may enforce the requested state by the ICSI and/or IARI in the contact header field to all the associated identities to the UE's contact. Meaning if the ICSI and/or IARI requests activation, then all the identities associated to the UE's contact are activated and if the ICSI and/or IARI requests deactivation, then all the identities associated to the UE's contact are deactivated.

Figure 6:
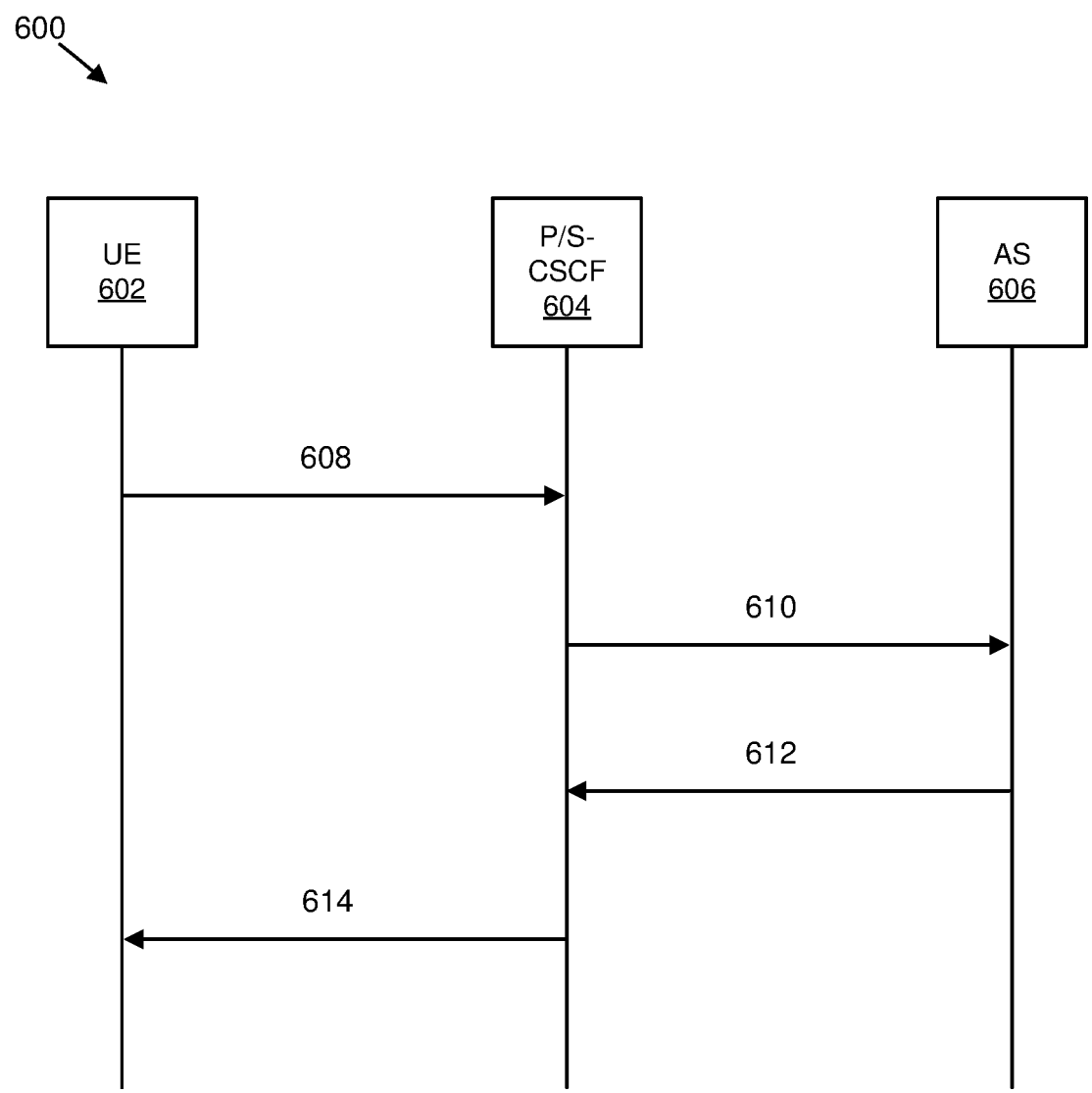
FIG. 6 is a schematic block diagram illustrating another embodiment of a system for temporary activation and deactivation of a contact.

FIG. 6 is a schematic block diagram illustrating another embodiment of a system 600 for temporary activation and deactivation of a contact. The system 600 includes a UE 602, a P/S-CSCF 604, and an AS 606. Each of the communications in the system 600 may include one or more messages.

In a first communication 608, the UE 602 may transmit a REGISTER request message (e.g., Header—contact: ICSI, Body—Identities).

In a second communication 610, the P/S-CSCF 604 may transmit the REGISTER request message (e.g., Body—contact: ICSI, Identities).

In a third communication 612, the AS 606 may transmit a 200 OK message.

In a fourth communication 614, the P/S-CSCF 604 may transmit the 200 OK message. The procedure of FIG. 6 may be similar to FIG. 4 except that the identities are listed in the body of the SIP REGISTER message instead of P-Associated-URI header.

In certain embodiments, if a phone and a smart watch are not sharing IMPU (e.g., identity) or sharing the same IMPU (e.g., identity) but have two different IMPIs (e.g., contacts) within the same IMS subscription, any incoming call may be routed to both devices. The user can control how the call should be terminated by caller preferences and adding a Q value to the IMPIs at the time of registration. The device with the registered IMPI to the IMPU with lower Q value may route the call the last.

In some embodiments, if a phone and a smart watch are sharing the same IMPU (e.g., identity) but have two different IMPIs (e.g., contacts) for two different IMS subscriptions, any incoming call may be routed to both devices. Caller preferences may not be used.

In a second embodiment, for a requirement that the 3GPP system may support a mechanism for an authorized user to set user preferences to indicate which identities are active or inactive on a specific UE, since the contact may not be registered to the external alternative identity and virtual identity, a traditional SIP procedure may be used (e.g., such as sending a SIP REGISTER request message with no contact header field and receiving a list of the IMPUs (e.g., identities) which have binding to that contact (e.g., IMPI)).

In various embodiments, if an identity is activated or deactivated, all UEs that can use that identity to either originate or terminate a session may receive a notification of the change of status. In certain embodiments, a different nature and activation and deactivation may be interpreted as a permanent activation and deactivation. In some embodiments, if identities are related to an IMS registration, then may need to be de-register for being deactivated. Thus, for native, alternative, and external alternative identities, a contact is de-registered from a contact.

In certain embodiments, upon receipt of a response to an initial registration, a UE may subscribe to a reg event package for a public user identity registered at a user's registrar (e.g., S-CSCF). In some embodiments, if a UE has registered a contact (e.g., IMPI) to an identity (e.g., IMPI) and receives a 200 OK for the registration, the UE must subscribe to the status of that identity (e.g., IMPU). Thus, if the UE registers its contact to a native identity and an alternative identity, then the UE has automatically subscribed to the reg event for those identities. Therefore, the UE may receive a notification for any change of status. Since the UE has not registered its contact to the external alternative identities, the UE has not subscribed to the reg event for the external alternative identities. It may be possible for the UE to subscribe to the reg event for the external alternative identities to get notification if those identities have any change of status such as the owner of the identities de-register its contact from those external alternative identities and the external alternative identities have been deactivated.

In various embodiments, a virtual identity is not related to an IMS registration and, if the privilege of using it is removed from a contact (e.g., meaning the identity has been deactivated for a contact), the user may be notified by other means than subscription to the reg event for the virtual identities.

In certain embodiments, notifying a contact when an identity transitions from activated to deactivated may be interpreted that the activation and deactivation is permanent and thus can be implemented by subscription to the reg event package for that identity if the identity is IMS registered.

Figure 7:
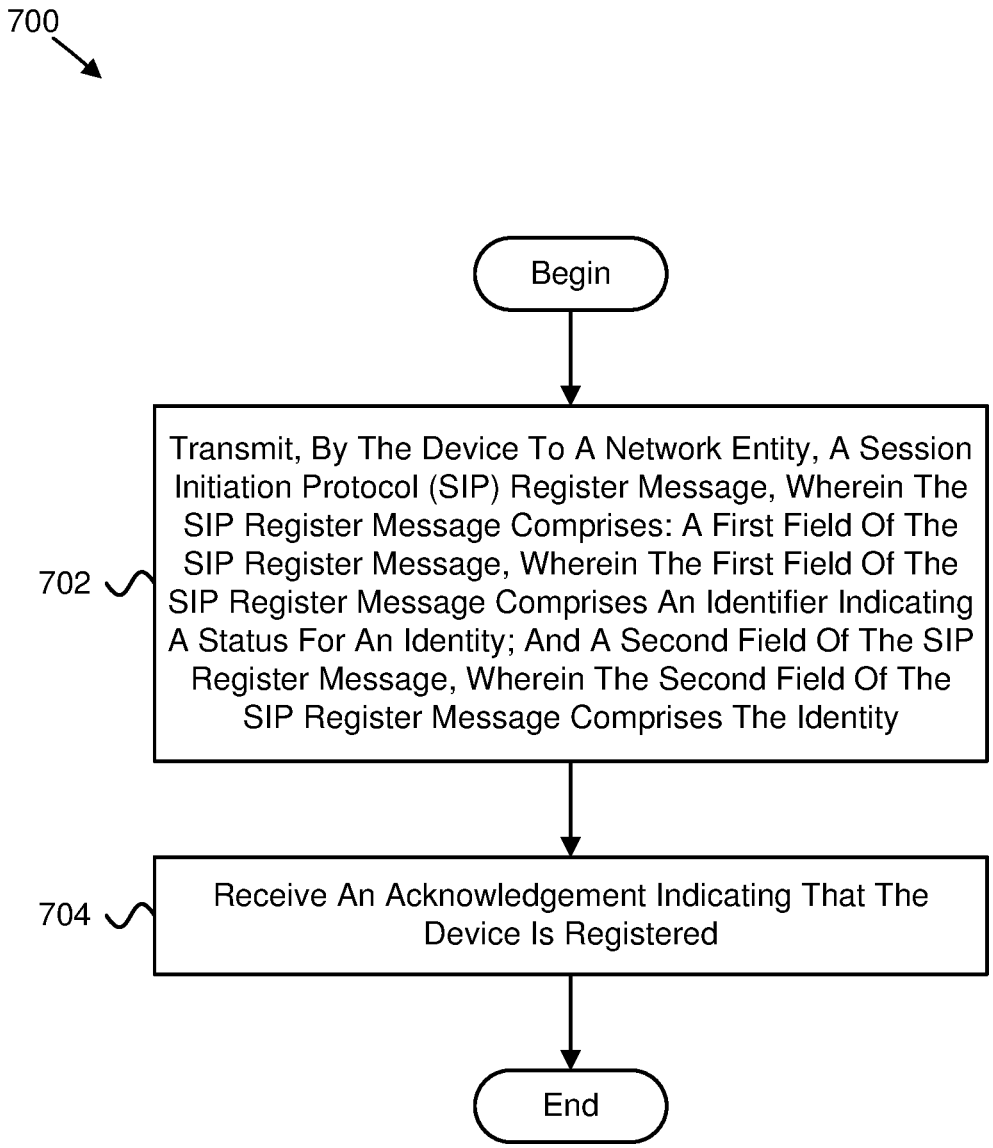
FIG. 7 is a flow chart diagram illustrating one embodiment of a method for configuring a SIP register message.

FIG. 7 is a flow chart diagram illustrating one embodiment of a method 700 for configuring a SIP register message. In some embodiments, the method 700 is performed by an apparatus, such as the remote unit 102. In certain embodiments, the method 700 may be performed by a processor executing program code, for example, a microcontroller, a microprocessor, a CPU, a GPU, an auxiliary processing unit, a FPGA, or the like.

In various embodiments, the method 700 includes transmitting 702, by a device to a network entity, a session initiation protocol (SIP) register message. The SIP register message includes: a first field of the SIP register message, wherein the first field of the SIP register message includes an identifier indicating a status for an identity; and a second field of the SIP register message. The second field of the SIP register message includes the identity. In some embodiments, the method 700 includes receiving 704 an acknowledgement indicating that the device is registered.

In certain embodiments, the first field of the SIP register message comprises a first contact header field. In some embodiments, the second field of the SIP register message comprises a P-Associated uniform resource identifier (URI) header field. In various embodiments, the second field of the SIP register message is a body of the SIP register message.

In one embodiment, the identifier is an internet protocol multimedia subsystem (IMS) communication identifier (ICSI). In certain embodiments, the identifier is an IMS application reference identifier (URI). In some embodiments, the status comprises activation.

In various embodiments, the status comprises deactivation. In one embodiment, the identity is an IMS public user identity (IMPU). In certain embodiments, the device registers an IMS private identity (IMPI) to the IMPU.

In some embodiments, the acknowledgement comprises a second message, and the second message comprises: a contact header field of the second message comprising the identifier indicating the status for the identity; and a second field of the second message comprising the identity. In various embodiments, the second field of the second message comprises a P-Associated URI header field. In one embodiment, the second field of the second message is a body of the second message.

In certain embodiments, the second message is a SIP 200 OK message. In some embodiments, the device comprises a user equipment.

Figure 8:
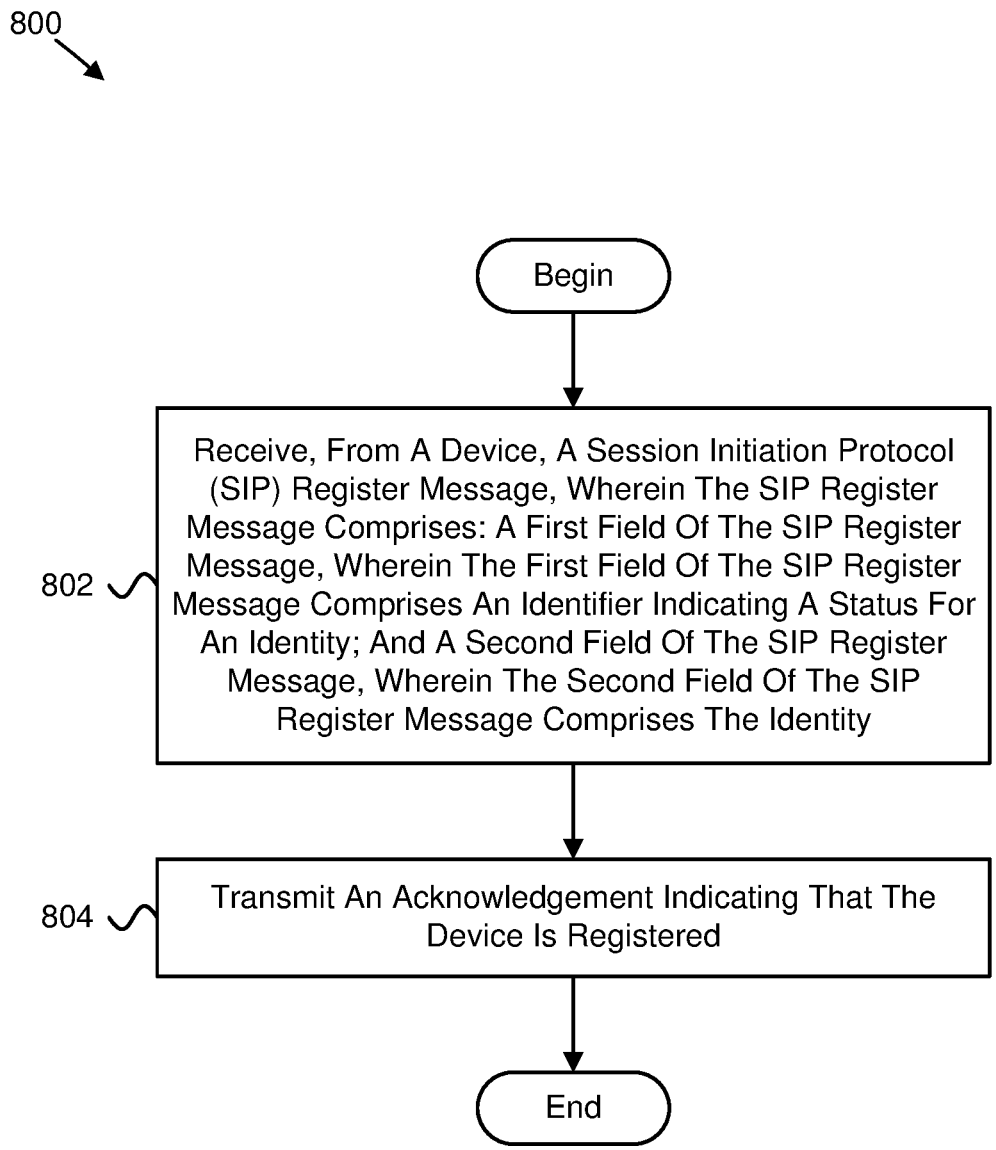
FIG. 8 is a flow chart diagram illustrating another embodiment of a method for configuring a SIP register message.

FIG. 8 is a flow chart diagram illustrating another embodiment of a method 800 for configuring a SIP register message. In some embodiments, the method 800 is performed by an apparatus, such as the network unit 104. In certain embodiments, the method 800 may be performed by a processor executing program code, for example, a microcontroller, a microprocessor, a CPU, a GPU, an auxiliary processing unit, a FPGA, or the like.

In various embodiments, the method 800 includes receiving 802, at a network entity from a device, a session initiation protocol (SIP) register message. The SIP register message includes: a first field of the SIP register message, wherein the first field of the SIP register message includes an identifier indicating a status for an identity; and a second field of the SIP register message. The second field of the SIP register message includes the identity. In some embodiments, the method 800 includes transmitting 804 an acknowledgement indicating that the device is registered.

In certain embodiments, the first field of the SIP register message comprises a first contact header field. In some embodiments, the second field of the SIP register message comprises a P-Associated uniform resource identifier (URI) header field. In various embodiments, the second field of the SIP register message is a body of the SIP register message.

In one embodiment, the identifier is an internet protocol multimedia subsystem (IMS) communication identifier (ICSI). In certain embodiments, the identifier is an IMS application reference identifier (URI). In some embodiments, the status comprises activation.

In various embodiments, the status comprises deactivation. In one embodiment, the identity is an IMS public user identity (IMPU). In certain embodiments, the device registers an IMS private identity (IMPI) to the IMPU.

In some embodiments, the acknowledgement comprises a second message, and the second message comprises: a contact header field of the second message comprising the identifier indicating the status for the identity; and a second field of the second message comprising the identity. In various embodiments, the second field of the second message comprises a P-Associated URI header field. In one embodiment, the second field of the second message is a body of the second message.

In certain embodiments, the second message is a SIP 200 OK message. In some embodiments, the device comprises a user equipment. In various embodiments, the method 800 further comprises transmitting the SIP register message to a second network entity and receiving the acknowledgment from the second network entity.

In one embodiment, a method of a device comprises: transmitting, by the device to a network entity, a session initiation protocol (SIP) register message, wherein the SIP register message comprises: a first field of the SIP register message, wherein the first field of the SIP register message comprises an identifier indicating a status for an identity; and a second field of the SIP register message, wherein the second field of the SIP register message comprises the identity; and receiving an acknowledgement indicating that the device is registered.

In certain embodiments, the first field of the SIP register message comprises a first contact header field.

In some embodiments, the second field of the SIP register message comprises a P-Associated uniform resource identifier (URI) header field.

In various embodiments, the second field of the SIP register message is a body of the SIP register message.

In one embodiment, the identifier is an internet protocol multimedia subsystem (IMS) communication identifier (ICSI).

In certain embodiments, the identifier is an IMS application reference identifier (IARI).

In some embodiments, the status comprises activation.

In various embodiments, the status comprises deactivation.

In one embodiment, the identity is an IMS public user identity (IMPU).

In certain embodiments, the device registers an IMS private identity (IMPI) to the IMPU.

In some embodiments, the acknowledgement comprises a second message, and the second message comprises: a contact header field of the second message comprising the identifier indicating the status for the identity; and a second field of the second message comprising the identity.

In various embodiments, the second field of the second message comprises a P-Associated URI header field.

In one embodiment, the second field of the second message is a body of the second message.

In certain embodiments, the second message is a SIP 200 OK message.

In some embodiments, the device comprises a user equipment.

In one embodiment, an apparatus comprises a device. The apparatus further comprises: a transmitter that transmits, by the device to a network entity, a session initiation protocol (SIP) register message, wherein the SIP register message comprises: a first field of the SIP register message, wherein the first field of the SIP register message comprises an identifier indicating a status for an identity; and a second field of the SIP register message, wherein the second field of the SIP register message comprises the identity; and a receiver that receives an acknowledgement indicating that the device is registered.

In certain embodiments, the first field of the SIP register message comprises a first contact header field.

In some embodiments, the second field of the SIP register message comprises a P-Associated uniform resource identifier (URI) header field.

In various embodiments, the second field of the SIP register message is a body of the SIP register message.

In one embodiment, the identifier is an internet protocol multimedia subsystem (IMS) communication identifier (ICSI).

In certain embodiments, the identifier is an IMS application reference identifier (IARI).

In some embodiments, the status comprises activation.

In various embodiments, the status comprises deactivation.

In one embodiment, the identity is an IMS public user identity (IMPU).

In certain embodiments, the device registers an IMS private identity (IMPI) to the IMPU.

In some embodiments, the acknowledgement comprises a second message, and the second message comprises: a contact header field of the second message comprising the identifier indicating the status for the identity; and a second field of the second message comprising the identity.

In various embodiments, the second field of the second message comprises a P-Associated URI header field.

In one embodiment, the second field of the second message is a body of the second message.

In certain embodiments, the second message is a SIP 200 OK message.

In some embodiments, the device comprises a user equipment.

In one embodiment, a method of a network entity comprises: receiving, from a device, a session initiation protocol (SIP) register message, wherein the SIP register message comprises: a first field of the SIP register message, wherein the first field of the SIP register message comprises an identifier indicating a status for an identity; and a second field of the SIP register message, wherein the second field of the SIP register message comprises the identity; and transmitting an acknowledgement indicating that the device is registered.

In certain embodiments, the first field of the SIP register message comprises a first contact header field.

In some embodiments, the second field of the SIP register message comprises a P-Associated uniform resource identifier (URI) header field.

In various embodiments, the second field of the SIP register message is a body of the SIP register message.

In one embodiment, the identifier is an internet protocol multimedia subsystem (IMS) communication identifier (ICSI).

In certain embodiments, the identifier is an IMS application reference identifier (IARI).

In some embodiments, the status comprises activation.

In various embodiments, the status comprises deactivation.

In one embodiment, the identity is an IMS public user identity (IMPU).

In certain embodiments, the device registers an IMS private identity (IMPI) to the IMPU.

In some embodiments, the acknowledgement comprises a second message, and the second message comprises: a contact header field of the second message comprising the identifier indicating the status for the identity; and a second field of the second message comprising the identity.

In various embodiments, the second field of the second message comprises a P-Associated URI header field.

In one embodiment, the second field of the second message is a body of the second message.

In certain embodiments, the second message is a SIP 200 OK message.

In some embodiments, the device comprises a user equipment.

In various embodiments, the method further comprises transmitting the SIP register message to a second network entity and receiving the acknowledgment from the second network entity.

In one embodiment, an apparatus comprises a network entity. The apparatus further comprises: a receiver that receives, from a device, a session initiation protocol (SIP) register message, wherein the SIP register message comprises: a first field of the SIP register message, wherein the first field of the SIP register message comprises an identifier indicating a status for an identity; and a second field of the SIP register message, wherein the second field of the SIP register message comprises the identity; and a transmitter that transmits an acknowledgement indicating that the device is registered.

In certain embodiments, the first field of the SIP register message comprises a first contact header field.

In some embodiments, the second field of the SIP register message comprises a P-Associated uniform resource identifier (URI) header field.

In various embodiments, the second field of the SIP register message is a body of the SIP register message.

In one embodiment, the identifier is an internet protocol multimedia subsystem (IMS) communication identifier (ICSI).

In certain embodiments, the identifier is an IMS application reference identifier (IARI).

In some embodiments, the status comprises activation.

In various embodiments, the status comprises deactivation.

In one embodiment, the identity is an IMS public user identity (IMPU).

In certain embodiments, the device registers an IMS private identity (IMPI) to the IMPU.

In some embodiments, the acknowledgement comprises a second message, and the second message comprises: a contact header field of the second message comprising the identifier indicating the status for the identity; and a second field of the second message comprising the identity.

In various embodiments, the second field of the second message comprises a P-Associated URI header field.

In one embodiment, the second field of the second message is a body of the second message.

In certain embodiments, the second message is a SIP 200 OK message.

In some embodiments, the device comprises a user equipment.

In various embodiments, the transmitter transmits the SIP register message to a second network entity and receiving the acknowledgment from the second network entity.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method performed by a user equipment (UE), the method comprising:
    determining a list of registered devices and a plurality of identities, wherein each identity of the plurality of identities corresponds to a registered device of the list of registered devices;
    transmitting, to a network entity, a session initiation protocol (SIP) register message, wherein the SIP register message comprises:
        a first field of the SIP register message, wherein the first field of the SIP register message comprises an identifier indicating a control command comprising an activation or deactivation command for an identity, wherein the identity corresponds to a registered device; and
        a second field of the SIP register message, wherein the second field of the SIP register message comprises the identity; and
    receiving an acknowledgement associated with the SIP register message.

2. A user equipment (UE) comprising:
    at least one memory; and
    at least one processor coupled with the at least one memory and configured to cause the UE to:
        determine a list of registered devices and a plurality of identities, wherein each identity of the plurality of identities corresponds to a registered device of the list of registered devices;
        transmit, to a network entity, a session initiation protocol (SIP) register message, wherein the SIP register message comprises:
            a first field of the SIP register message, wherein the first field of the SIP register message comprises an identifier indicating a control command comprising an activation or deactivation command for an identity, wherein the identity corresponds to a registered device; and
            a second field of the SIP register message, wherein the second field of the SIP register message comprises the identity; and
        receive an acknowledgement associated with the SIP register message.

3. The UE of claim 2, wherein the first field of the SIP register message comprises a first contact header field.

4. The UE of claim 2, wherein the second field of the SIP register message comprises a P-Associated uniform resource identifier (URI) header field.

5. The UE of claim 2, wherein the second field of the SIP register message is a body of the SIP register message.

6. The UE of claim 2, wherein the identifier is an internet protocol multimedia subsystem (IMS) communication identifier (ICSI) or an IMS application reference identifier (IARI).

7. The UE of claim 2, wherein the identity is an IMS public user identity (IMPU).

8. The UE of claim 7, wherein the UE registers an IMS private identity (IMPI) to the IMPU.

9. The UE of claim 2, wherein the acknowledgement comprises a second message, and the second message comprises:
    a contact header field of the second message comprising the identifier indicating status for the identity; and
    a second field of the second message comprising the identity.

10. The UE of claim 9, wherein the second field of the second message comprises a P-Associated URI header field.

11. The UE of claim 9, wherein the second field of the second message is a body of the second message.

12. The UE of claim 9, wherein the second message is a SIP 200 OK message.

13. A base station, comprising:
    at least one memory;
    at least one processor coupled with the at least one memory and configured to cause the base station to:
        receive, from a device, a session initiation protocol (SIP) register message, wherein the SIP register message comprises:
            a first field of the SIP register message, wherein the first field of the SIP register message comprises an identifier indicating a control command comprising an activation or deactivation command for an identity, wherein the identity corresponds to a registered device; and
            a second field of the SIP register message, wherein the second field of the SIP register message comprises the identity; and
        transmit an acknowledgement associated with the SIP register message indicating that the UE is registered.

14. A processor for wireless communication, comprising:
    at least one controller coupled with at least one memory and configured to cause the processor to:
        determine a list of registered devices and a plurality of identities, wherein each identity of the plurality of identities corresponds to a registered device of the list of registered devices;
        transmit, to a network entity, a session initiation protocol (SIP) register message, wherein the SIP register message comprises:
            a first field of the SIP register message, wherein the first field of the SIP register message comprises an identifier indicating a control command comprising an activation or deactivation command for an identity, wherein the identity corresponds to a registered device; and
            a second field of the SIP register message, wherein the second field of the SIP register message comprises the identity; and
        receive an acknowledgement associated with the SIP register message.

15. The processor of claim 14, wherein the first field of the SIP register message comprises a first contact header field.

16. The processor of claim 14, wherein the second field of the SIP register message comprises a P-Associated uniform resource identifier (URI) header field.

17. The processor of claim 14, wherein the second field of the SIP register message is a body of the SIP register message.

18. The processor of claim 14, wherein the identifier is an internet protocol multimedia subsystem (IMS) communication identifier (ICSI) or an IMS application reference identifier (IARI).

* * * * *